July 14, 1964 H. FRENK ETAL 3,140,637
MOTION PICTURE PROJECTOR OPERABLE ON DIFFERENT A.C. SOURCES
Filed June 27, 1961 6 Sheets-Sheet 1

INVENTORS
HELMUTH FRENK
HERIBERT LUSSEM
ROBERT MEES

By Toulmin & Toulmin
Attorneys

INVENTORS
HELMUTH FRENK
HERIBERT LUSSEM
ROBERT MEES
By Toulmin & Toulmin
Attorneys July 14, 1964   H. FRENK ETAL   3,140,637
MOTION PICTURE PROJECTOR OPERABLE ON DIFFERENT A.C. SOURCES
Filed June 27, 1961   6 Sheets-Sheet 4

INVENTORS
HELMUTH FRENK
HERIBERT LUSSEM
ROBERT MEES
By Toulmin & Toulmin
Attorneys

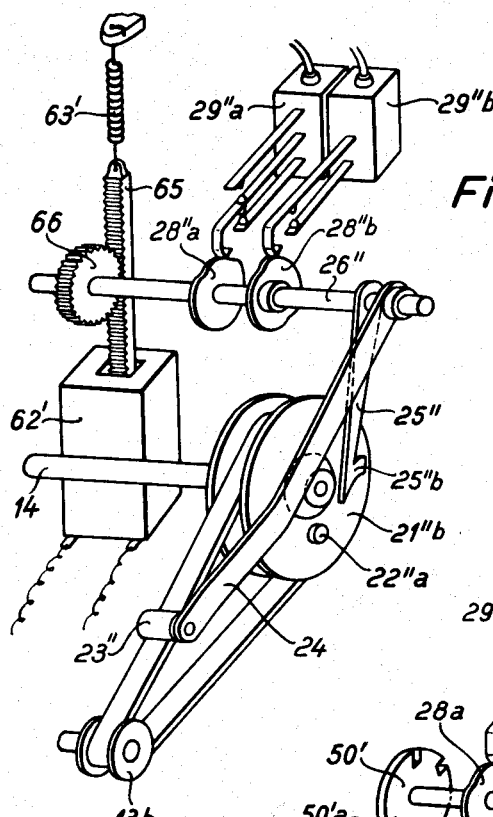
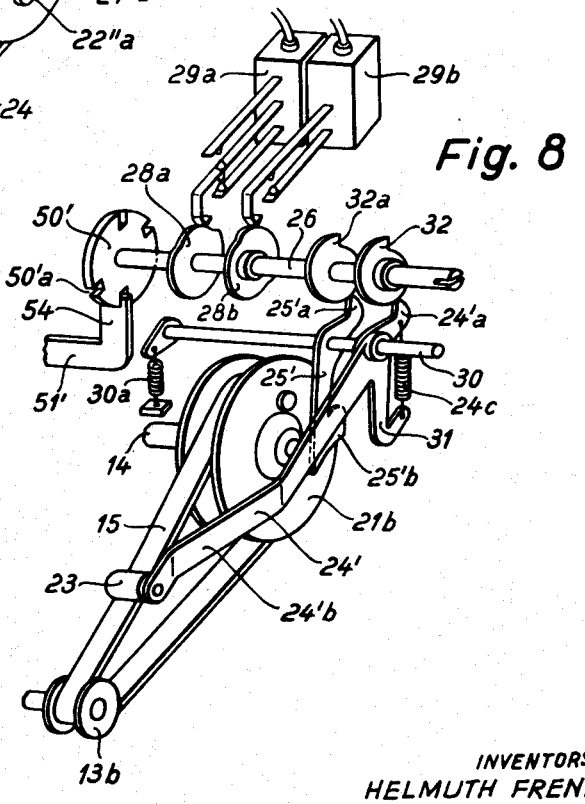

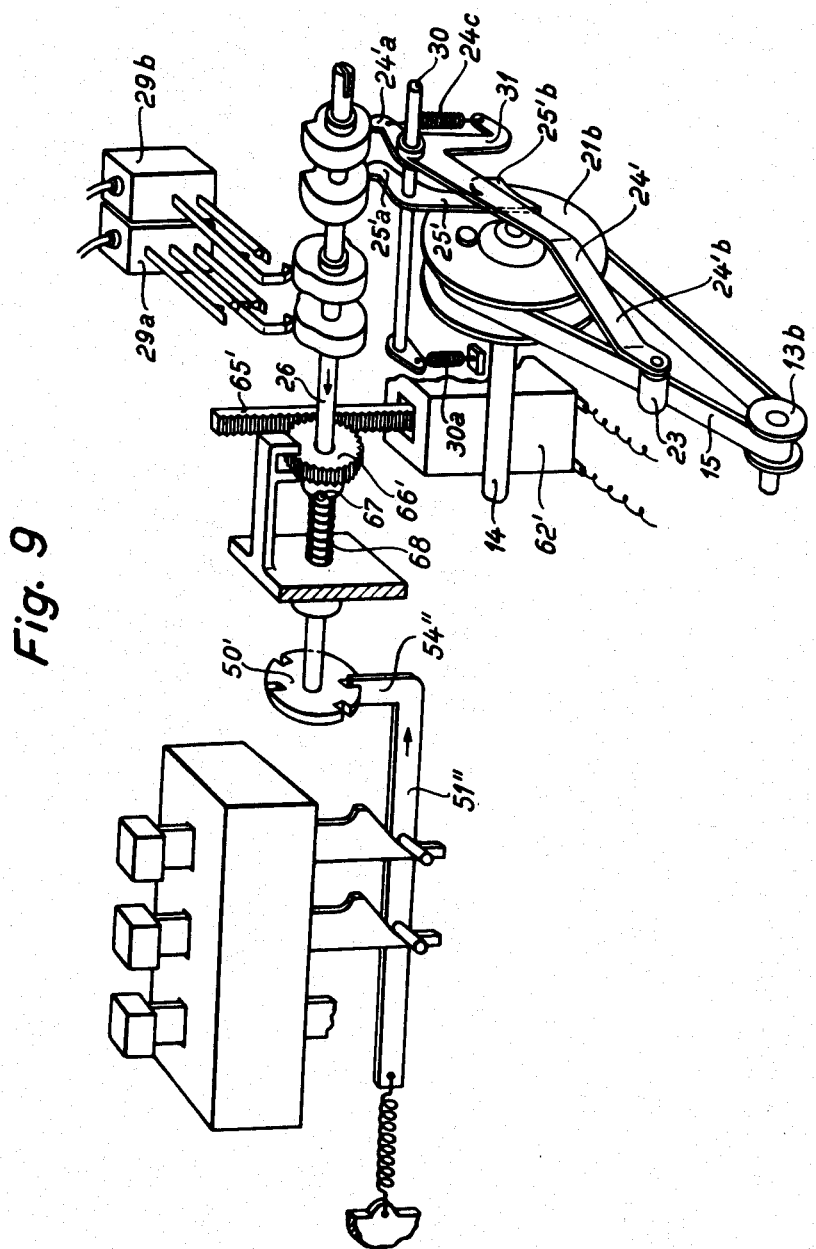

United States Patent Office 3,140,637
Patented July 14, 1964

3,140,637
MOTION PICTURE PROJECTOR OPERABLE ON DIFFERENT A.C. SOURCES
Helmuth Frenk and Heribert Lüssem, Wetzlar (Lahn), and Robert Mees, Wissmar, Kreis Wetzlar (Lahn), Germany, assignors to Ernst Leitz Gesellschaft mit beschrankter Haftung, Wetzlar (Lahn), Germany
Filed June 27, 1961, Ser. No. 119,892
Claims priority, application Germany July 1, 1960
21 Claims. (Cl. 88—17)

The present invention relates to a motion picture projector having a single-phase induction motor which can be connected to electric power sources having different voltages and frequencies.

The electric power systems supplying buildings in various countries of the world with electrical energy are not uniform. They generally vary in voltage and alternating current lines also in frequency. The most commonly used alternating current supply lines are as follows: 220 v., 50 cycles, 110 v., 50 cycles, 117 v., 60 cycles.

It is not possible to operate an apparatus provided with an electric motor constructed for a particular alternating current voltage by connecting this motor to another source of alternating current at a different voltage without making structural changes in the apparatus. This is particularly true when a constant speed of the motor shaft is essential such as in the case of motion picture projectors. In this form of apparatus the conditions for which the electric motor was designed must be rigidly observed.

Motion picture projectors are generally provided with a single-phase induction motor whose speed varies directly as the frequency. If a motor which is constructed for 50 cycles per second is connected with an alternating current source at 60 cycles per second, the speed of the motor will increase by approximately 20% and the torque output of the motor will decrease by approximately 10%. In addition, besides compensating for the different voltages of various electric power sources, special arrangements must be made for maintaining the speed of the motor constant.

It is therefore the principal object of this invention to provide a novel and improved motion picture projector operated by a single-phase induction motor.

It is another object of this invention to provide a motion picture projector having a single-phase motor together with suitable structure so that the motor can be connected with one of a plurality of different alternating current sources without changing the construction of the motor and with a minimum of modifying steps.

The objects of the present invention are achieved by providing a motion picture projector with an adjusting member which is actuated whenever the operation of the motor is to be changed from 50 cycles to 60 cycles. This adjusting means simultaneously reverses the transmission ratio of the coupling between the motor shaft and the power shaft, makes the necessary switching changes with the secondary circuit in a transformer which is connected to the motor, and operates a switching circuit to connect a second condenser in parallel with the motor condenser. The adjusting means may also be constructed to operate a switch which reverses the primary winding of the transformer which is connected to the motor. This reversing can be automatically accomplished by a relay which is responsive to voltage and a duplex switch actuated by the relay.

The motion picture projector constructed in accordance with the present invention can be connected to A.C. power sources of 220 volts/50 cycles or of 110 volts/50 cycles without any special modifications by the operator. The necessary switching is automatically performed by a relay built into the projector, which relay is responsive to voltage. If, in addition to the voltage, the frequency is also changed, an additional modification is necessary, namely the actuation of the previously mentioned adjusting means.

According to the present invention the aforementioned modification can also be eliminated by so constructing the projector that the operator may connect the projector to any A.C. power source without first ascertaining the voltage and frequency of the source. To accomplish this, a circuit is provided in the projector which comprises a relay and a condenser. The condenser is so selected that, at a predetermined frequency together with the inductance of the relay connected thereto, a series-resonance is obtained.

When the voltage of the power source to which the projector is connected is changed from 50 to 60 cycles, the relay actuates an electromagnet which, in turn, operates the adjusting means. This eliminates any manual manipulations by the operator.

If the armature of the electromagnet is not energized, the relay should be such that, during operation thereof at a lower frequency than the resonant frequency, the electromagnet will not be energized and the armature will remain in its extended position.

Conversely, the relay coil must be so selected that connection to an A.C. power source having a resonant frequency, must provide a sufficient energization of the electromagnet to retain the armature in its energized position. This is true even though the induction of the relay coil will be increased after the electromagnet has been energized.

The driving connection between the motor and the power shaft for actuating various components of the projector comprises a V-belt which interconnects the fixed-diameter pulley on the drive shaft of the motor and a variable-diameter pulley mounted on the power shaft. The variable-diameter pulley is of the split half structure where the halves are movable axially with respect to each other. A belt tightener arm is provided to maintain a constant tension on the belt during adjustments of the pulley. A structure is provided for adjusting the variable-diameter pulley as a function of the position of the frequency adjusting means. Accordingly, differences in speed of the motor because of changes in the frequency of the power source are compensated so that the power shaft is driven at a constant speed.

The frequency adjusting means is positioned either by manual manipulation by the operator or automatically by an electromagnet actuated by a relay of the series resonance circuit. For each frequency either one or two positions of the frequency adjusting means can be obtained. When only one position is used, the projector will always project a fixed number of pictures per second whereas when two positions are used the projector can be adjusted to either one of two different image frequencies, for instance 18 or 24 frames per second.

A cutoff and adjustable coupling is used between the frequency adjusting means and the electromagnet in order to preselect the number of frames to be projected per second in those projectors having a switching device that is automatically actuated when the frequency of the power source is changed.

A locking member is provided for the frequency adjusting means. This locking member operates as a function of the switching position of the push-button switches which are connected in the motor circuit. The locking member is unlocked when the motor is operated in either forward or reversed directions.

As a result, the frequency adjusting means can be actuated only when the motor is operating. This locking member is particularly important in projectors provided with an adjusting means that can be manually switched off when the frequency of the power source is changed.

The locking member is also useful in projectors having adjusting means which are automatically reversible during frequency changes. However, the projector must be so constructed to have at least two different rates of image projection. The selection of the rate of image projection can also be accomplished by manually switching the adjusting means and this switching is possible while the motor is operating.

Other objects and advantages of this invention will be apparent upon reference to the accompanying description when taken in conjunction with the following drawings, wherein FIGURE 1 is an elevational view schematically illustrating the front of the projector of this invention;

FIGURE 7 is a perspective view of the V-belt drive provided with a frequency adjusting means operated by an electromagnet to provide for a constant image frequency;

FIGURE 8 is a perspective view of the V-belt drive provided with a manually operable frequency adjusting means constructed for two image frequencies; and FIGURE 9 is a perspective view of the V-belt drive provided with a frequency adjusting means operated by a magnet and with a stop member becoming effective in response to the actuation of the switch constructed for two image frequencies.

Returning now to the drawings wherein like reference symbols indicate the same parts throughout the various views, a specific embodiment and several modifications of this invention will be described.

Figure 1:
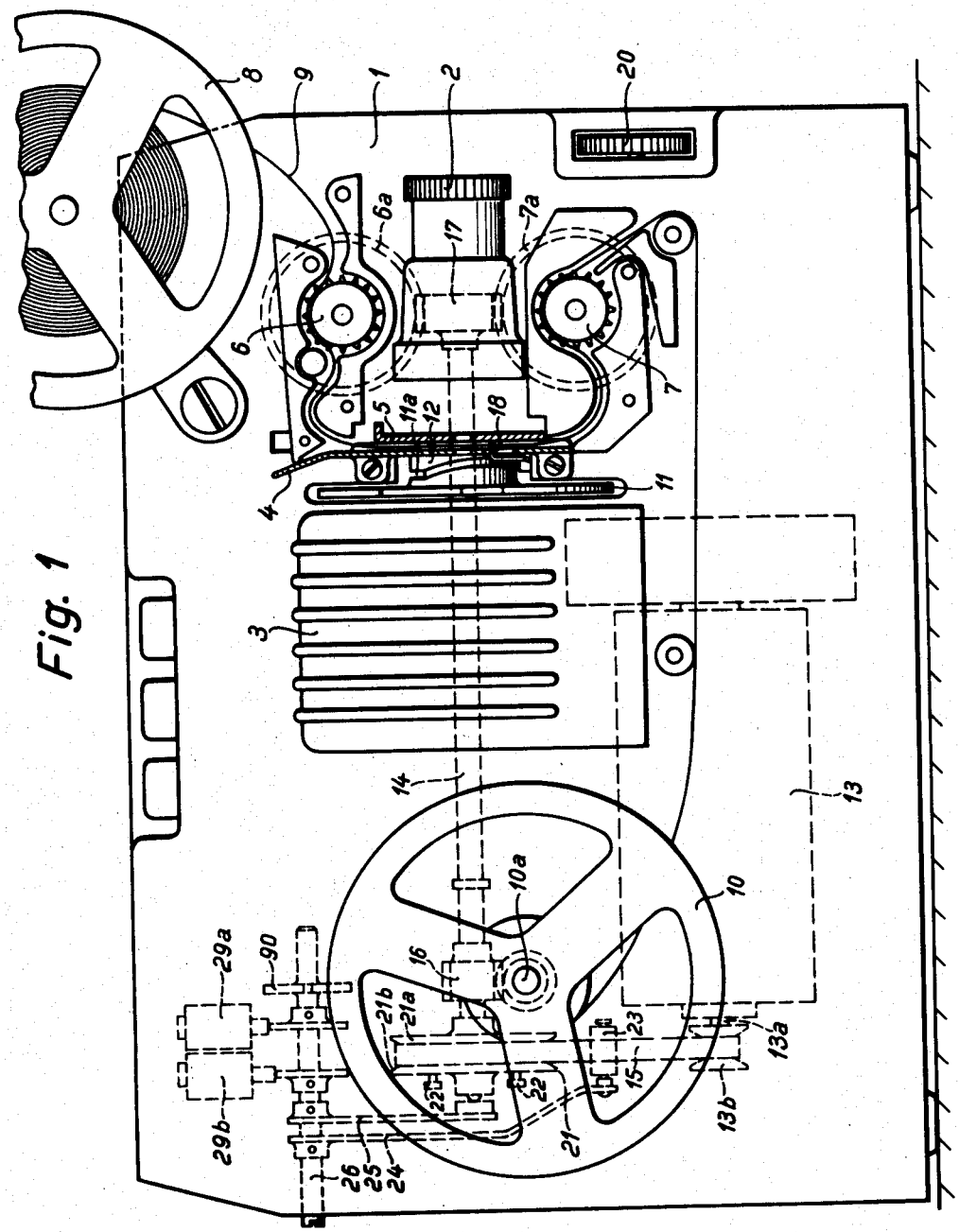

In FIGURE 1 a moving picture projector has a casing 1 which supports an objective lens 2 in front of a lamp housing 3. Between the lamp housing and the objective lens 2 there are mounted a film guiding plate 4 and an image aperture plate 5. Above and below the objective lens 2 film feed sprockets 6 and 7, respectively, are placed which drive a film indicated at 9 supplied by a delivery reel 8 over the film guiding plate 4 to a take-up reel 10.

A sectorial diaphragm or shutter 11 having a hub 12 with a cam 11a therein rotates in front of the film guiding plate 4.

Figure 2:
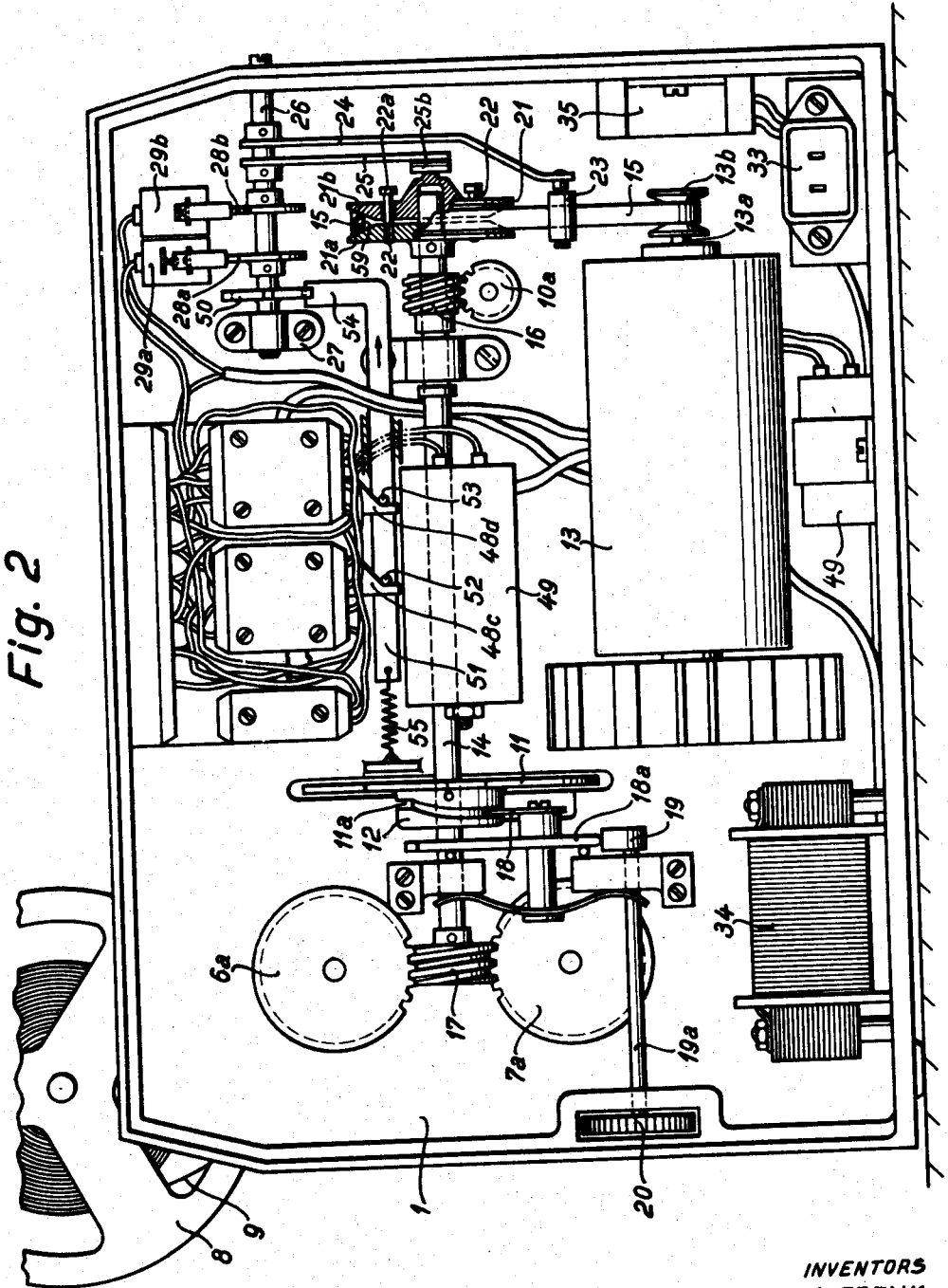
FIGURE 2 is an elevational view of the reverse side of the projector when the casing is removed.

A single-phase induction motor 13 having a drive shaft 13a is indicated in dashed lines in FIGURE 1 for general information. The specific position is shown in FIGURE 2. The shaft 13a of motor 13 is operatively connected with a shaft 14 by means of a belt 15. Fixedly mounted on shaft 14 are two worm gears 16 and 17. Worm gear 16 drives a toothed wheel 10a which is drivingly connected by a friction coupling with the take-up reel 10. Worm gear 17 meshes with two gears 6a and 7a, which drive the film feed sprockets 6 and 7, respectively.

Fixedly mounted on the shaft 14 is the sectorial diaphragm 11, whose cam groove 11a which, when the shaft 14 rotates, moves a film gripper member 18 in a way known per se and which is therefore not described in detail. An eccentric disc 19, mounted on a shaft 19a, also acts in a known manner on gripper member 18 or on its guide part 18a. An adjustment of eccentric 19 by actuating a knurled knob 20 effects a displacement in height of the working stroke of the point of the gripper. This arrangement serves for vertically adjusting the picture during the projection.

There is a variable-diameter pulley 21 comprising pulley halves 21a and 21b mounted on the power shaft 14. The pulley half 21a is fixedly mounted on the shaft 14 and has a plurality of pins 22 axially extending therefrom. The pins are provided with enlarged heads 22a. The pulley half 21b is slidably mounted on the pins 22. The belt 15 connects this variable-diameter pulley with a fixed-diameter pulley 13b mounted on the motor shaft 13a.

The cooperating surfaces of the pulley halves form an angle with respect to each other which corresponds to the angle of the sides of the V-belt 15. The pins 22 are slidably received in holes in the pulley half 21b and the enlarged heads 22a limit the axial movement of the pulley half 21b away from the pulley half 21a. The axial movement of the pulley half 21b in the other direction is limited by the fixed pulley half 21a.

The driving connection between the motor 13 and the power shaft 14 also comprises an idler pulley 23 mounted on the end of a belt tightener arm 24 and an actuating lever 25 for adjusting the variable-diameter pulley. The arms 24 and the lever 25 are fixedly mounted on a cam shaft 26 having one end journaled in the projector casing 1 and the other end in a bearing block 27. A pair of cam discs 28a and 28b are mounted on the cam shaft 26 and respectively control two micro-switches 29a and 29b. The function of the cam shaft 26 is to change the projector from an operation at a frequency of 50 cycles to an operation at a frequency of 60 cycles. This cam shaft adjusts the transmission ratio of the V-belt and also transverses the necessary electrical switching by actuating the micro-switches 29a and 29b.

The varying of the belt transmission ratio is accomplished by rotating the actuating arm 25 between two positions. The actuating arm 25 is at its lower end provided with a portion 25b extending obliquely to the power shaft 14 which in one position maintains the split pulley half 21b against the pulley half 21a, whereas in the other position the portion 25b does not contact the pulley half 21b. The pulley half 21b is then free to move under the force of the belt 15 as far away from the pulley half 21a as the pins 22 will permit.

Fixedly mounted on the cam shaft 26 is a slotted wheel 50 which cooperates with a locking bar 51. This structure may be seen in FIGURES 2 and 6. The locking bar is provided with two transversely extending pins 52 and 53.

There are two push-button switches 48a and 48b which are connected into the motor circuit of the projector. These switches are provided with push rods 48c and 48d which have cam surfaces 56 and 57 which engage the pins 52 and 53, respectively.

The locking bar 51 is also provided with an extension 54 which cooperatse with notches 50a formed in the locking element 50 mounted on the cam shaft 26. A spring 55 is connected to the other end of the locking bar 51.

This structure comprises a locking device for the cam shaft 26 which ensures that the cam shaft is rotatable only when the motor is operating. When either of the switches 48a or 48b is pushed downwardly to operate the motor in either the forward or reverse direction, the cam surfaces on the push rods 48c or 48d will operate to push the locking bar 51 to the right in the direction of the arrow 58 shown in FIGURE 6 so as to disengage the extension 54 from a notch 50a. Since the cam shaft 26 in the embodiment of FIGURE 6 has two possible positions, the locking element 50 is provided with two corresponding notches 50a.

It is pointed out that more than two operating positions can be provided for the cam shaft 26 so that the projector may be adapted for a plurality of image frequencies.

Figure 3:
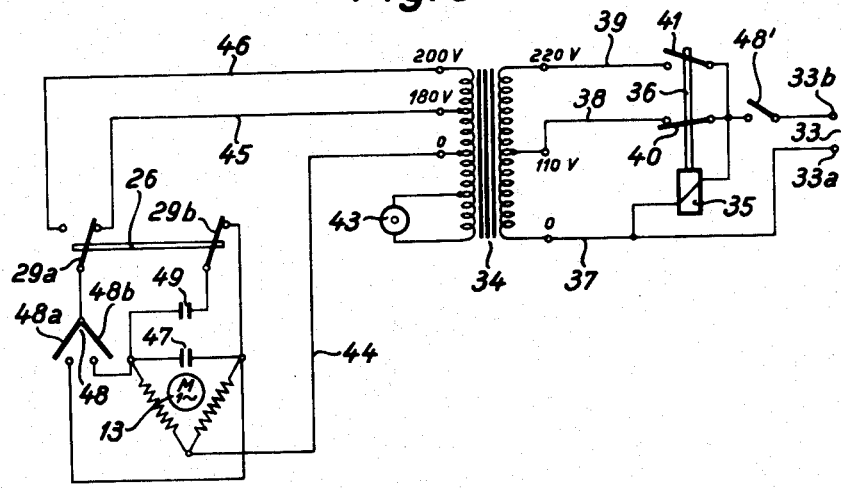
FIGURES 3 to 5 are schematic electrical circuit diagrams of the motor in three different embodiments.

Also illustrated in FIGURE 2 are additional electrical components comprising a connecting socket 33, a power transformer 34 and a relay 35. The electrical connections of these components can be seen in FIGURE 3 wherein the transformer 34 has three primary terminals with one terminal being for a 110 volt source and the other for a 220 volt source. An electric line 37 connects one terminal 33a of the connecting socket 33 directly with the 0-terminal of the transformer 34. Electric lines 38 and 39 connect the second terminal 33b through moveable contact arms 40 and 41 with the terminals for 110 volts and 220 volts, respectively, of the transformer 34. The relay 35 has a single armature 36 which is connected to the contact arms 40 and 41 to actuate these switches in response to the voltage. The relay 35 is connected across the terminals 33a and 33b of the connecting socket 33.

The secondary winding of the transformer 34 comprises five terminals. A low-voltage lamp 43 is connected across two of the terminals and the remaining three terminals are used for the operation of the motor 13.

The 0-terminal is connected by a line 44 directly to the motor 13. Leads 45 and 46 extend from the secondary terminals for 180 volts and 200 volts, respectively, and are connected through switches 29a and 48a, 48b to the motor 13.

A switch 29a connects the motor 13 with either the 180 volts or 200 volts terminal of the transformer secondary winding. Two switches 48a and 48b are manually operated by the operator to control the forward and reverse operation of the projector.

An additional switch 48' is connected in the supply line for the transformer primary winding. This switch 48' is coupled with the push-button switches 48a, 48b. The switch 48' is always closed when one of the push-button switches 48a or 48b is depressed so that the actual switching of the projectior is accomplished at the primary winding.

The condenser 47 which is also mounted in the projector casing is connected between the stator windings of the motor 13 for shifting the phase of the current energizing the motor. The second condenser 49 is provided to be connected in parallel with the condenser 47. This is accomplished by a switch 29b which, together with the reversing switch 29a, is actuated by the cam shaft 26 in the manner previously described.

When using a transformer having a primary winding for 110 volts, the circuit diagram comprising the voltage-responsive relay may also be used for connecting a corresponding compensating resistance. The function of the electrical components and the mechanical transmission ratio mechanism are coordinated as follows:

If it is desired to connect the projector to an A.C. supply at 220 volts/50 cycles, the operator initially checks that the cam shaft 26 is adjusted according to 50 cycles.

When the cam shaft is adjusted to a 50 cycle frequency, the motor will be connected by the reversing switch 29a to the lead 45 which connects to the 180 volts terminal of the transformer secondary winding. Switch 29b is simultaneously closed to connect the condenser 49 in parallel with the condenser 47. In this position of the cam shaft 26 the actuating arm 25 does not contact the moveable pulley half 21b. Accordingly, pulley half 21b will be moved by the tension of the belt 15 to its extreme position as determined by the heads 22a of the pins 22. The diameter of the variable pulley will therefore be reduced and the belt 15 will slip into the space 59 between the pulley halves. This respositioning of the belt will determine the transmission ratio between the gears 13b and 21. The belt tightener arm 24 is adjusted to correspond to a 50 cycle frequency and will maintain a constant tension on the belt 15 at this new diameter of the variable pulley 21.

After the projector is connected across the power source and switched, the primary winding of the transformer 34 is automatically switched to correspond to a 220 volts primary winding. The voltage-responsive relay 35 will be energized at a voltage of approximately 200 volts. Energization of the relay will open the switch 40 and close the switch 41. The closing of the switch 41 will connect the lead 39 which extends between the 200 volts terminal on the primary winding and the socket 33. The projector is now adjusted to an A.C. power source of 220 volts/50 cycles.

In the event the projector is subsequently connected to an A.C. power source of 110 volts/50 cycles, no particular adjustments by the operator are required. Since 110 volts is insufficient to energize the relay 35 the switch 40 will remain closed and will accordingly connect terminal 33b of the connecting socket 33 with the 110 volts terminal of the transformer primary winding. The switch 41 will be open. In the normal unenergized position of the relay 35 the switch 40 is closed and the switch 41 is open.

The primary winding of the transformer 34 is similarly switched when the projector is connected to an A.C. power source of 117 volts/60 cycles. This voltage will also be applied to the primary winding terminal for 110 volts. There will accordingly be a slight difference in the image frequency when a 117 volts power source is used. This difference is negligible and can be compensated for by proper dimensioning of the transmission gear.

In order to adjust the projector for the 60 cycles frequency of an A.C. power source of 117 volts/60 cycles the following procedure is accomplished:

Initially, the switch 29a is actuated to connect the motor 13 with the 200 volts terminal of the secondary winding. Simultaneously, the switch 29b is open which disconnects the parallel connection of the condenser 49. This is accomplished since a somewhat higher voltage must be applied to the motor 13 at an operation of 60 cycles than when the motor is connected to a 50 cycles source. This higher voltage is necessary to maintain the torque power of the motor substantially constant. It is noted that for a higher frequency the condenser may have a smaller capacitance for effecting the phase displacement for the motor.

Figure 6:
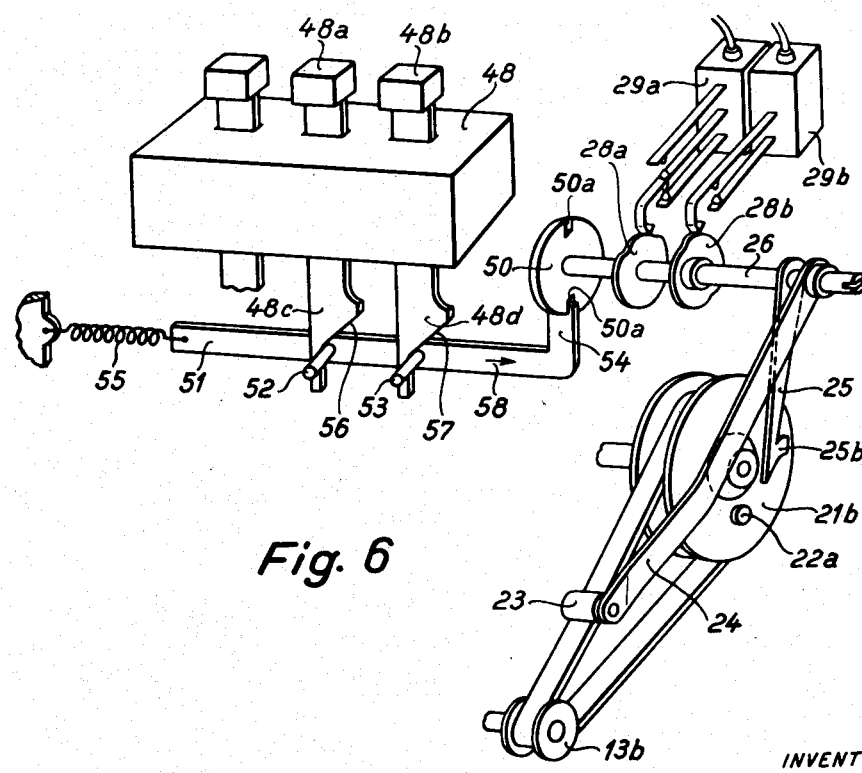
FIGURE 6 is a perspective view of the V-belt drive provided with a manually operable frequency adjusting means and with a stop member becoming effective in response to the actuation of the switch in order to project a constant number of images per second.

Next, the actuating arm 25 is moved against the pulley half 21b and the belt tightener arm 24 is released from the belt. This is shown in FIGURE 6. The force exerted by the arm 25 on the pulley half 21b axially moves the pulley half 21b into engagement with the pulley half 21a. The diameter of the pulley is therefore increased and the transmission ratio is now about 20% greater than when the cam shaft 26 is adjusted to the 50 cycles position.

Figure 4:
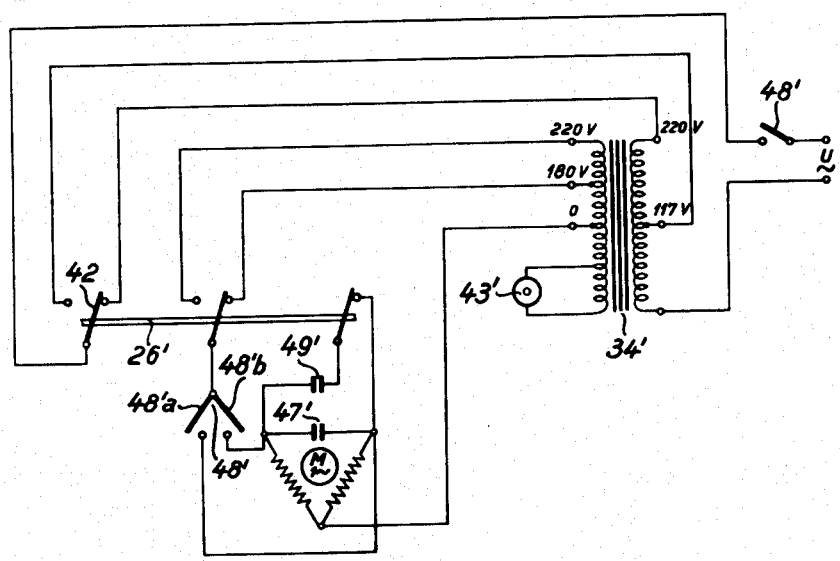

In FIGURE 4 there is illustrated a simplified modification of a switching circuit of a projector which can be connected only to A.C. power sources of 220 volts/50 cycles or 117 volts/60 cycles. This modification differs from that shown in FIGURE 3 in that the primary winding circuit of the transformer 34' does not contain a voltage-responsive relay. Since in this modification a change in voltage also requires a change in frequency, it is necessary to actuate the cam shaft 26 during each change in the power source. As a result, the voltage reverse switch 42 of the primary circuit is actuated by the cam shaft 26' together with other electrical switching components and the transmission gear. While the uses of this type of projector are somewhat limited, nevertheless the cost of manufacturing this switching arrangement is substantially reduced.

Figure 5:
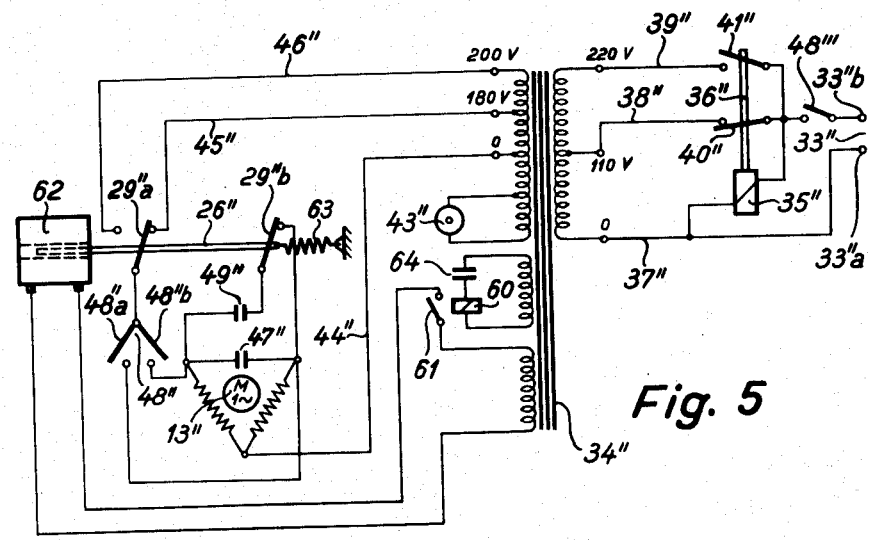

The manual switching of the cam shaft 26 can also be automatically accomplished, as schematically illustrated in the circuit diagram of FIGURE 5. A series resonance circuit is used comprising a relay connected in series therewith to actuate the electromagnet.

The series resonance circuit comprises a relay 60 actuating a contactor 61 which controls an energization circuit for an electromagnet 62. The relay 60 is shown in FIGURE 5 in its normal open position. The electromagnet 62 actuates the cam shaft 26" which is the armature of the electromagnet. A spring 63 is used to maintain the cam shaft 26″ in the position as illustrated in FIGURE 5. The condenser 64 is connected in the resonance circuit in series with the relay 60. The inductance of the relay coil 60 and the capacitance of the condenser 64 are so related to each other so as to produce a series resonance and the relay 60 is energized when a voltage having a frequency of 60 cycles is applied. Energizing the relay will cause the contactor 61 to energize the electromagnet which is also connected to the secondary winding of the transformer 34″. Energization of the electromagnet 62 will move cam shaft 26″ to the left, as viewed in FIGURE 5, to open the switch 29″b and to connect the switch 29″a with the 200 volts terminal of the transformer secondary winding.

If a voltage of another frequency such as 50 cycles is connected to the projector, the circuit will remain in the position as shown in FIGURE 5. A spring 63 will maintain the cam shaft 26″ in such a position that the switch 29″b is closed and the switch 29″a is connected to the 180 volts terminal on the secondary winding of the transformer.

Proceeding to FIGURE 7 there is illustrated an arrangement which is somewhat similar to that shown in FIGURE 6 but wherein the necessity for a locking device is eliminated. In the arrangement of FIGURE 7 there is an electromagnet 62′ which actuates a rack gear 65 as an armature. The rack gear is biased into one position by a spring 63′. The rack gear 65 engages a pinion 66 which is mounted on the cam shaft 26″. This arrangement will effectively rotate the cam shaft 26″ between the 50 cycles and 60 cycles positions.

It is also possible to arrange a plurality of series resonance circuits in parallel with respect to each other. In this modification reversals in response to a plurality of voltage frequencies can be automatically achieved by the corresponding relays.

Proceeding to FIGURE 8 there is illustrated therein a transmission arrangement wherein the projector can be adjusted to two image frequencies. In this modification four instead of two switching positions must be provided for the cam shaft 26. Two positions are required for operating at 50 cycles and two positions for operating at 60 cycles.

In the modification of FIGURE 8 the belt tightener arm 24′ and the actuating arm 25′ are mounted upon an additional shaft 30 and co-act with radial cam discs 32 and 32a which are fixedly mounted on the cam shaft 26.

The actuating arm 25′ is fixedly mounted on the shaft 30 and comprises a two-armed lever, one end 25′a being urged against the cam disc 32a and the other end being engageable with the variable pulley half 21b in a manner as previously described.

The belt tightener arm comprises two separate levers 24′ and 24′a. The lever 24′ has an arm 31 which is connected to the lever 24′a by a spring 24c. The lever 24′a is fixedly mounted on a shaft 30 but the tightener arm 24′ is rotatably mounted on this shaft. One pivotal point of the spring 24c at the lever 24′a moves during rotation of the cam shaft 26 approximately in the direction of the force exerted by the spring. This causes a constant pressure of the idler pulley 23 on the belt 15 in all of the four positions. In addition, this device functions as an overload clutch on the starting of the motor.

Both the actuating arm 25′ and the moveable pulley half 21b each have four positions which correspond to the four switching positions of this modification. A flange 25′b is provided on the lower end of the actuating arm 25′ and is engageable in the various switching positions with the moveable pulley half 21b. The actuating arm, accordingly, will position the pulley half 21b in one of four positions. These four positions of the pulley half will give four different diameters of the variable pulley and, accordingly, four different transmission ratios. These transmission ratios are correlated to the frequency of the power source and the desired frame speed of the projector.

The belt tightener arm 24′ also has four different positions to maintain the tension of the belt 15 constant during the four different transmission ratios.

It is possible in this modification to fixedly mount both the actuating arm 25′ and the belt tightener arm 24′ on the cam shaft 26. As a result, there would be a very short movement of these components from one switching position to the next. It would then be suitable to rotate both the actuating arm 25′ and the tightener arm 24′ by radial cam discs 32 and 32a whose gradient is so chosen that it is necessary to rotate the cam shaft 26 through a substantial angle in order to positively switch from one switching position to the successive switching position. The positions of the cam discs 28a and 28b would then be so coordinated to the position of the radial cam discs 32 and 32a that an electric switching will occur when the cam shaft 26 is rotated from the setting 60 cycles/18 frames per second to the setting 50 cycles/24 frames per second. These frame speeds are only examples and the particular frame speeds employed may be chosen to fit particular circumstances.

In FIGURE 9 there is shown another modification of the actuating arm, the belt tightener arm and the cam shaft where the cam shaft is operatively connected by means of a releasable clutch to a rack gear actuated by an electromagnet. In this arrangement a pinion gear 66′ is mounted on the cam shaft 26 and an electromagnet 62′ has as an armature a rack gear 65′ which engages said pinion gear.

The releasable clutch comprises a crosspin 67 mounted in the cam shaft 26 which crosspin is engageable with a radially extending groove in the hub of the gear 66′. A spring 68 biases the cam shaft 26 to the right, as viewed in FIGURE 9.

When the cam shaft 26 is moved in the direction of the arrow against the force of the spring 68, the pinion 66′ will remain stationary but the clutch between the pinion 66′ and the cam shaft 26 will be released. The pinion 66′ will then be freely rotatable. The operator will then rotate the cam shaft to select the frame speed and the rotation of the cam shaft in the clutched position by the electromagnet 62′, and the rack gear 65′ will be transmitted by the cam shaft. This rotation of the cam shaft is necessary for balancing the respective operating voltage frequency.

It is pointed out that in this embodiment the cam shaft 26 is also locked against rotation when the motor is not operating. The same locking bar arrangement as illustrated in FIGURE 5 can be employed. This locking bar arrangement is released in response to the operation of the motor switches for forward or reversed rotation of the motor. Accordingly, the selection of the frame speed is possible only when the motor is operating.

The slotted wheel locking element 50′ is provided with four slots instead of two to correspond to the four switching positions of the cam shaft 26. However, in FIGURE 9 the extension 54″ is enlarged so that the locking bar is not released by the axial movement of the cam shaft 26 in the direction of the arrow.

Thus it can be seen that the present invention provides a motion picture projector which can be connected to one of several different types of alternating current power sources without requiring any manipulation by the operator to adapt the projector to different voltages and frequencies. The several modifications disclosed in this invention provide also for a simplified version wherein some manipulation is necessary but wherein the structure is greatly simplified.

It will be understood that this invention is susceptible to modification in order to adapt it to different usages and conditions and, accordingly, it is desired to comprehend such modifications within this invention as may fall within the scope of the appended claims.

What is claimed as this invention is:

1. A motion picture projector for connection to A.C. power sources of different voltage and frequency, and comprising terminal means, a single-phase induction motor having a condenser for phase displacement of the current therein, a shaft for driving several of the components of the projector, a variable speed transmission drivingly connecting said motor and said shaft, a transformer having primary and secondary windings variable connecting means for connecting said primary winding to said terminal means and said motor to said secondary winding, a second condenser adapted to be connected in parallel with said first condenser, switch means for connecting said second condenser in parallel to said first condenser, and means for simultaneously adjusting (a) said variable transmission, (b) said connecting means, once for power source voltage adaption and again for frequency adaption and (c) said switch means for said second condenser to correspond to the frequency of the A.C. power source to which the projector is connected.

2. A motion picture projector for connection to A.C. power sources of different voltage and frequency, and comprising input terminals for immediate connection to a power source, a single-phase induction motor having a condenser for phase displacement of the current therein, a shaft for driving several of the components of the projector, a variable speed transmission drivingly connecting said motor and said shaft, a transformer having primary and secondary windings variable connecting means for connecting said primary winding to said terminals, variable connecting means for connecting said motor to said secondary winding, a second condenser adapted to be connected in parallel with said first condenser, switch means for connecting said second condenser in parallel to said first condenser, and means for concurrently operating said two variable connecting means dependent on voltage and frequency of the A.C. source, and for adjusting said variable transmission and said switch means for said second condenser to correspond to the frequency of the A.C. power source to which the projector is connected.

3. A motion picture projector for connection to A.C. power sources of different voltage and frequency, and comprising a single-phase induction motor having a condenser for phase displacement of the current therein, a shaft for driving several of the components of the projector, a variable speed transmission drivingly connecting said motor and said shaft, a transformer having primary and secondary windings, variable connecting means for connecting said motor to said secondary winding, a relay connected in the primary circuit of said transformer and responsive to the voltage source connected to said primary, means responsive to said relay for switching the primary connection in accordance with the voltage of the A.C. source, a second condenser adapted to be connected in parallel with said first condenser, switch means for connecting said second condenser in parallel to said first condenser, and means for simultaneously adjusting said variable transmission, said variable connecting means and said switch means for said second condenser to correspond to the frequency of the A.C. power source to which the projector is connected.

4. A motion picture projector for connection to A.C. power sources of different voltage and frequency, and comprising input terminals for immediate connection to a power source, a casing, a single-phase induction motor in said casing having a condenser for phase displacement of the current therein, a shaft for driving several of the components of the projector, a variable speed transmission drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, and a cam shaft rotatably mounted on said projector and actuatable exteriorly of said projector casing for adjusting said transmission and one of said connecting means, and for actuating said switch means for said second condenser to correspond to the frequency of the A.C. power source to which the projector is connected, and means for adjusting the other one of said two variable connecting means to correspond to the voltage of said source.

5. A motion picture projector for connection to A.C. power sources of different voltage and frequency, and comprising a casing, a single-phase induction motor in said casing having a condenser for phase displacement of the current therein, a shaft for driving several of the components of the projector, a variable speed transmission drivingly connecting said motor and said shaft, a transformer having an adjustable primary winding and a secondary winding with said motor being adjustably connected to said secondary winding, a second condenser adapted to be connected in parallel with said first condenser, switch means for connecting said second condenser in parallel to said first condenser, a cam shaft rotatably mounted on said projector and actuatable for adjusting said clutch, and said secondary winding connected to said motor, and for actuating said switch means for said second condenser to correspond to the frequency of the A.C. power source to which the projector is connected, an electromagnet for actuating said cam shaft, and a relay responsive to the frequency of an A.C. source connected to said transformer primary, said relay being actuated at a predetermined frequency of the power source connected to said transformer primary to energized said electromagnet.

6. A motion picture projector for connection to A.C. power sources of different voltage and frequency, and comprising input terminals for immediate connection to a power source, a casing, a single-phase induction motor in said casing having a condenser for phase displacement of the current therein, a shaft for driving several of the components of the projector, a variable speed transmission drivingly connecting said motor and said shaft, a transformer having primary and secondary windings, variable connecting means for connecting said primary winding to said terminal, variable connecting means for connecting said motor to said secondary winding, a second condenser adapted to be connected in parallel with said first condenser, switch means for connecting said second condenser in parallel to said first condenser, a cam shaft rotatably mounted on said projector and actuatable for adjusting said transmission and one of said variable connecting means, and for actuating said switch means for said second condenser to correspond to the frequency of the A.C. power source to which the projector is connected, an electromagnet for actuating said cam shaft, a resonant circuit in the secondary circuit of said transformer and comprising a relay and a condenser connected in series thereto, said relay being responsive to the frequency of an A.C. source connected to said transformer primary, said relay being actuated at a predetermined frequency of the power source connected to said transformer primary to energize said electromagnet, and means for adjusting the other one of said two variable connecting means to correspond to the voltage of said source.

7. A motion picture projector for connection to A.C. power sources of different voltage and frequency, and comprising a casing, a single-phase induction motor in said casing having a condenser for phase displacement of the current therein, a shaft for driving several of the components of the projector, a variable speed transmission drivingly connecting said motor and said shaft, a transformer having primary and secondary windings with said motor being connected to said secondary winding, a second condenser adapted to be connected in parallel with said first condenser, switch means for connecting said second condenser in parallel to said first condenser, a cam shaft rotatably mounted on said projector for adjusting said transmission, adjusting the secondary winding of the transformer, and for actuating said switch means for said second condenser to correspond to the frequency of the A.C. power source to which the projector is connected, an electromagnet having an armature linked to said cam shaft for actuation thereof, a resonant circuit in the secondary circuit of said transformer and comprising a relay and a condenser connected in series thereto, said relay being responsive to the frequency of an A.C. source connected to said transformer primary, said relay being actuated at a predetermined frequency of the power source connected to said transformer primary to energize said electromagnet, said cam shaft armature remaining in the non-actuated position when the frequency of the power source is less than the resonant frequency of the resonant circuit and the armature is in the non-actuated position.

8. A motion picture projector for connection to A.C. power sources of different voltage and frequency, and comprising input terminals for immediate connection to a power source, a casing, a single-phase induction motor in said casing having a condenser for phase displacement of the current therein, a shaft for driving several of the components of the projector, a variable speed transmission drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, a cam shaft rotatably mounted on said projector and actuatable exteriorly of said projector casing for adjusting said transmission and one of said connecting means, and for actuating said switch means for said second condenser to correspond to the frequency of the A.C. power source to which the projector is connected, an electromagnet with armature linked to said cam shaft for actuation thereof, a resonant circuit in the secondary circuit of said transformer and comprising a relay and a condenser connected in series thereto, said relay being responsive to the frequency of an A.C. source connected to said transformer primary, said relay being actuated at a predetermined frequency of the power source connected to said transformer primary to energize said electromagnet, said relay after response being held in the actuated position when a voltage having a resonant frequency is applied, and means for adjusting the other one of said two variable connecting means to correspond to the voltage of said source.

9. A motion picture projector having a single image frequency for connection to A.C. power sources of different voltage and frequency, and comprising input terminals for immediate connection to a power source, a single-phase induction motor having a condenser for phase displacement of the current therein, a shaft for driving several of the components of the projector, a variable speed transmission and a belt drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, and a cam shaft rotatably mounted on said projector, there being cam discs, a clutch-actuating lever and a belt tightener arm fixedly mounted on said cam shaft for simultaneously adjusting said variable transmission and one of said connecting means, and for actuating said switch means for said second condenser to correspond to the frequency of the A.C. power source to which the projector is connected, and means for adjusting the other one of said two variable connecting means to correspond to the voltage of said source.

10. A motion picture projector having a plurality of image frequencies for connecting to A.C. power sources of different voltage and frequency, and comprising terminal means, a single-phase induction motor having a condenser for phase dispacement of the current therein, a shaft for driving several of the components of the projector, a variable speed transmission drivingly connecting said motor and said shaft, a transformer having primary and secondary windings variable connecting means for connecting said primary winding to said terminal means and said motor to said secondary winding, a second condenser adapted to be connected in parallel with said first condenser, switch means for connecting said second condenser in parallel to said first condenser, a cam shaft rotatably mounted on said projector, there being cam discs and radial cam discs fixedly mounted on said cam shaft, and means governing said variable speed transmission and being actuated by said radial cam discs for selecting one of a plurality of image frequencies.

11. A motion picture projector having a single image frequency for connection to A.C. power sources of different voltage and frequency, and comprising input terminals for immediate connection to a power source, a single-phase induction motor having a condenser for phase displacement of the current therein, a shaft for driving several of the components of the projector, a variable speed transmission and a belt drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, a cam shaft rotatably mounted on said projector, there being cam discs, a transmission actuating lever and a belt tightener arm fixedly mounted on said cam shaft for adjusting said variable transmission, further switch means actuated by said cam discs for adjusting one of said connecting means concurrently with the adjustment of said transmission, said cam discs further actuate said switch means for said second condenser to correspond to the frequency of the A.C. power source to which the projector is connected, and switch means actuated by said cam discs, and means for adjusting the other one of said two variable connecting means to correspond to the voltage of said source.

12. A motion picture projector having a plurality of image frequencies for connection to A.C. power sources of different voltage and frequency, and comprising terminal means, a single-phase induction motor having a condenser for phase displacement of the current therein, a shaft for driving several of the components of the projector, a variable speed transmission and a belt drivingly connecting said motor and said shaft, a transformer having primary and secondary windings, variable connecting means for connecting said primary winding to said terminal means and said motor to said secondary winding, a second condenser adatped to be connected in parallel with said first condenser, switch means for connecting said second condenser in parallel to said first condenser, a cam shaft rotatably mounted on said projector, there being cam discs and radial cam discs fixedly mounted on said cam shaft, a second shaft rotatably mounted on said projector, spring means actuating against said second shaft to cause the rotation thereof, and a transmission actuating lever and a belt tightener arm fixedly mounted on said second shaft and actuated by said radial cam discs.

13. A motion picture projector having a plurality of image frequencies for connection to A.C. power sources of different voltage and frequency, and comprising terminal means, a single-phase induction motor having a condenser for phase displacement of the current therein, a shaft for driving several of the components of the projector, a variable speed transmission and a belt drivingly connecting said motor and said shaft, a transformer having primary and secondary windings, variable connecting means for connecting said primary winding to said terminal means and said motor to said secondary winding, switch means for actuating said variable connecting means, a second condenser adapted to be connected in parallel with said first condenser, switch means for connecting said second condenser in parallel to said first condenser, a cam shaft rotatably mounted on said projector, there being cam discs and radial cam discs fixedly mounted on said cam shaft, said cam discs actuating said two switch means, a second shaft rotatably mounted on said projector, spring means biassing said shaft to cause the rotation thereof, a transmission-actuating lever fixedly mounted on said second shaft, a belt tightener arm rotatably mounted on said second shaft, a lever arm fixedly mounted on said second shaft, and a tension spring interconnecting said lever arm and said belt tightener arm so that the pivotal point of the spring at the lever arm is displaceable in the direction of the force of the spring as a function of the transmission ratio whereby said belt tightener arm maintains a constant tension on said belt at all transmission ratios.

14. A motion picture projector for connection to A.C. power sources of different voltage and frequency, and comprising input terminals for immediate connection to a power source, a single-phase induction motor having a condenser for phase displacement of the current therein, a shaft for driving several of the components of the projector, a variable speed transmission drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, a cam shaft rotatably mounted on the projector for simultaneously adjusting said variable transmission and one of said connecting means, and for actuating said switch means for said second condenser to correspond to the frequency of the A.C. power source to which the projector is connected, a frequency responsive electromagnet for rotating said cam shaft, a releasable clutch connecting said cam shaft and said electromagnet, and means for adjusting the other one of said two variable connecting means to correspond to the voltage of said source.

15. A motion picture projector for connection to A.C. power sources of different voltage and frequency, and comprising input terminals for immediate connection to a power source, a single-phase induction motor having a condenser for phase displacement of the current therein, a shaft for driving several of the components of the projector, a variable speed transmission drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, a cam shaft rotatably mounted on the projector for simultaneously adjusting said variable transmission and one of said connecting means, and for actuating said switch means for said second condenser to correspond to the frequency of the A.C. power source to which the projector is connected, an electromagnet, a rack gear actuated by said electromagnet, a pinion gear on said cam shaft and engaging said rack gear, there being a groove in a face of said pinion gear, and a cross pin in said cam shaft engageable with said pinion gear groove to form a releasable clutch between said cam shaft and said electromagnet.

16. A motion picture projector for connection to A.C. power sources of different voltage and frequency, and comprising input terminals for immediate connection to a power source, a casing, a single-phase induction motor in said casing having a condenser for phase displacement of the current therein, a shaft for driving several of the components of the projector, a variable speed transmission drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, a cam shaft rotatably mounted on said projector and actuatable exteriorly of said projector casing for adjusting said transmission and one of said connecting means, and for actuating said switch means for said second condenser to correspond to the frequency of the A.C. power source to which the projector is connected, a locking device for securing said cam shaft against rotation when the motor is not running, and means for adjusting the other one of said two variable connecting means to correspond to the voltage of said source.

17. A motion picture projector for connection to A.C. power sources of different voltage and frequency, and comprising input terminals for immediate connection to a power source, a casing, a single-phase induction motor in said casing having a condenser for phase displacement of the current therein, a shaft for driving several of the components of the projector, a variable speed transmission drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, a cam shaft rotatably mounted on said projector for concurrently adjusting said transmission and one of said connecting means, and for actuating said switch means for said second condenser to correspond to the frequency of the A.C. power source to which the projector is connected, a locking device for securing said cam shaft against rotation when the motor is not running, means responsive to the closing of the motor circuit for forward and reverse operation for releasing said locking device, and means for adjusting the other one of said two variable connecting means to correspond to the voltage of said source.

18. A motion picture projector for connection to A.C. power sources of different voltage and frequency, and comprising input terminals for immediate connection to a power source, a casing, a single-phase induction motor in said casing having a condenser for phase displacement of the current therein, a shaft for driving several of the components of the projector, a variable speed transmission drivingly connecting said motor and said shaft, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, a cam shaft rotatably mounted on said projector for concurrently adjusting said transmission and one of said connecting means, and for actuating said switch means for said second condenser to correspond to the frequency of the A.C. power source to which the projector is connected, a locking element fixedly mounted on said cam shaft, a longitudinally displaceable bar engageable with said locking element, mechanical means actuated concurrently with the operation of a motor control switch for moving said bar to lock and unlock said cam shaft, and means for adjusting the other one of said two variable connecting means to correspond to the voltage of said source.

19. A motion picture projector for connection to A.C. power sources of different voltage and frequency, and comprising input terminals for immediate connection to a power source, a casing, a single-phase induction motor in said casing having a condenser for phase displacement of the current therein, a shaft for driving several of the components of the projector, a variable-diameter pulley mounted on said shaft, a constant-diameter pulley driven by said motor, a V-belt drivingly connecting said pulleys, a transformer having primary and secondary windings, variable connecting means for connecting said primary winding to said terminals, variable connecting means for connecting said motor to said secondary winding, a second condenser adapted to be connected in parallel with said first condenser, switch means for connecting said second condenser in parallel to said first condenser, means for simultaneously adjusting said variable pulley and one of said connecting means, and for actuating said switch means for said second condenser to correspond to the frequency of the A.C. power source to which the projector is connected, and means for adjusting the other one of said two variable connecting means to correspond to the voltage of said source.

20. A motion picture projector as claimed in claim 19 with said variable-diameter pulley comprising a pulley half fixed to said shaft, a plurality of pins axially extending from said fixed pulley half, and a second pulley half slidably mounted on said pins for axial movement with respect to said fixed pulley half.

21. A motion picture projector as claimed in claim 20 and further comprising an actuating arm engageable with said moveable pulley half to adjust the diameter of said variable-diameter pulley.

References Cited in the file of this patent

UNITED STATES PATENTS

| | | |
|---|---|---|
| 1,966,831 | Oakes et al. | July 17, 1934 |
| 2,134,159 | Von Hofe | Oct. 25, 1938 |
| 2,585,573 | Moore | Feb. 12, 1952 |
| 2,613,343 | Ober | Oct. 7, 1952 |
| 2,824,457 | Norton | Feb. 25, 1958 |